(12) United States Patent
Yamada et al.

(10) Patent No.: US 6,437,845 B1
(45) Date of Patent: Aug. 20, 2002

(54) LIQUID CRYSTAL DISPLAY DEVICE AND PLASMA-ADDRESSED DISPLAY USING THE SAME

(75) Inventors: Nobuaki Yamada; Yasuhiro Kume, both of Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/497,673

(22) Filed: Feb. 4, 2000

(30) Foreign Application Priority Data

Feb. 4, 1999 (JP) .......................................... 11-027947
Jul. 5, 1999 (JP) .......................................... 11-191053

(51) Int. Cl.[7] ..................... G02F 1/1337; G02F 1/1339; G02F 1/1333
(52) U.S. Cl. ....................... 349/129; 349/128; 349/156; 349/160
(58) Field of Search ................................ 349/128, 129, 349/156, 160

(56) References Cited

U.S. PATENT DOCUMENTS

| | | | | |
|---|---|---|---|---|
| 6,067,141 A | * | 5/2000 | Yamada et al. | 349/129 |
| 6,201,592 B1 | * | 3/2001 | Terashita et al. | 349/156 |
| 6,327,016 B1 | * | 12/2001 | Yamada et al. | 349/160 |
| 6,330,049 B1 | * | 12/2001 | Kume et al. | 349/156 |
| 6,335,780 B1 | * | 1/2002 | Kurihara et al. | 349/156 |
| 6,339,462 B1 | * | 1/2002 | Kishimoto et al. | 349/156 |

FOREIGN PATENT DOCUMENTS

| | | | |
|---|---|---|---|
| JP | 6-301015 A | 10/1994 |
| JP | 7-120728 A | 5/1995 |
| JP | 7-318940 A | 12/1995 |
| JP | 10-133206 A | 5/1998 |
| JP | 10-186331 A | 7/1998 |

* cited by examiner

*Primary Examiner*—William L. Sikes
*Assistant Examiner*—Julie Ngo
(74) *Attorney, Agent, or Firm*—Nixon & Vanderhye, P.C.

(57) ABSTRACT

A liquid crystal display device includes a first substrate having a vertical alignment layer provided thereon; a second substrate having a horizontal alignment layer provided thereon; a liquid crystal layer including liquid crystal molecules interposed between the first substrate and the second substrate; and a concave-convex structure for regulating an alignment direction of the liquid crystal molecules and a transparent conductive, layer provided on the concave-convex structure, the concave-convex structure being provided on one of the first substrate and the second substrate with one of the vertical alignment layer and the horizontal alignment layer interposed therebetween. The liquid crystal molecules in the vicinity of the horizontal alignment layer are aligned in an axially symmetrical manner when no voltage is provided, and the liquid crystal molecules in the liquid crystal layer-are aligned substantially vertically relative to the first substrate and the second substrate when a voltage is applied.

26 Claims, 14 Drawing Sheets

OFF state

Convex or concave portion

Convex or concave portion

Convex or concave portion

Convex or concave portion

OFF state

Intermediate state

ON state

LIQUID CRYSTAL DISPLAY DEVICE AND PLASMA-ADDRESSED DISPLAY USING THE SAME

BACKGROUND OF THE INVENTION

1. Field of the Invention

The present invention relates to a liquid crystal display (hereinafter, referred to as an "LCD") device which is suitable to uses requiring a large viewing angle and to realize large-screen display, and a plasma-addressed LCD device using such an LCD device.

2. Description of the Related Art (1) ASM Mode

Conventional LCD devices, as represented by TN (twisted nematic) mode LCD devices, cause liquid crystal molecules in the vicinity of two substrates to be aligned in one direction. Accordingly, as shown in FIG. 17, the liquid crystal molecules are tilted in one uniform direction when a voltage is supplied. As a result, the apparent phase difference of the liquid crystal molecules is significantly different when the LCD device is seen in a direction of arrow A and when being seen in a direction of arrow B. Therefore, the transmittance is different when the LCD device is seen in the direction of arrow A and when being seen in the direction of arrow B. Thus, the conventional LCD devices have anisotropy in the viewing angle characteristic.

In order to solve the problem, Japanese Laid-Open Publication No. 6-301015 discloses an ASM (axially symmetrically aligned microcell) mode for realizing a large viewing angle, by which liquid crystal molecules are aligned in an axially asymmetrical manner in each pixel. The ASM mode uses a p-type liquid crystal material. In a vertical plane, the liquid crystal molecules in the vicinity of the substrates are aligned substantially parallel to the substrates. In a horizontal plane, the liquid crystal molecules are aligned in an axially symmetrical manner in each of a top portion (FIG. 18A), an intermediate portion (FIG. 18B), and a bottom portion (FIG. 18C). By applying avoltage to the liquid crystal layer in this state, the liquid crystal molecules are tilted vertically to the substrates, and thus black display is provided.

Japanese Laid-Open Publication No. 7-120728, for example, discloses a method for producing an LCD device of the ASM mode. According to this method, a structure having a wall in a lattice pattern is formed on one of the two substrates, and the liquid crystal molecules are aligned in an axially asymmetric manner by interaction of the wall with the liquid crystal molecules.

These LCD devices of the ASM mode require a technology for polymerizing a photo-curable monomer in order to stably maintain the liquid crystal molecules.

Liquid crystal molecules of an n-type liquid crystal material can also be aligned in an axially asymmetrical manner. For example, Japanese Laid-Open Publication No. 10-133206 discloses realizing the ASM mode by using an n-type liquid crystal material together with a vertical alignment layer.

An LCD device of the ASM mode is produced in the following manner. A substrate is formed so as to have convex or concave portions in a lattice pattern on a surface thereof, and a vertical alignment layer is provided thereon. The substrate is assembled with another substrate having a vertical alignment layer provided thereon. A mixture of an n-type liquid crystal material and a photo-curable monomer is injected into a space between the two substrates to produce a cell. A voltage is applied to the n-type liquid crystal material to align liquid crystal molecules of the n-type liquid crystal material in an axially symmetrical manner. Then, the cell is irradiated with ultraviolet light to cure the photo-curable monomer. Thus, the axial symmetrical alignment is secured. Due to the secured axial symmetrical alignment, the direction in which the liquid crystal molecules are tilted when a voltage is applied is determined, which raises the response speed. As can be appreciated, the AMS mode using the n-type liquid crystal material also indispensably requires the technology for polymerizing a photo-curable monomer in order to stably maintain the liquid crystal molecules.

Japanese Laid-Open Publication No. 7-318940 discloses another method for producing an LCD device of an AMS mode. According to this method, a structure having a wall in a lattice pattern is provided on a substrate having electrodes, and a vertical alignment layer or a horizontal alignment layer is provided thereon. A stable axially symmetrical alignment is obtained by the function of the structure. Japanese Laid-Open Publication No. 7-318940 also discloses a hybrid-type axially symmetrical alignment realized by using a vertical alignment layer together with a horizontal alignment layer.

However, the method disclosed in this publication has a problem that since a transparent electrode is below the structure having a wall, a voltage is unlikely to be applied to a portion of the liquid crystal molecules which is above the wall of the structure. Thus, the contrast is lowered.

In the above-mentioned AMS mode LCD devices, a phase plate having a negative anisotropy is provided between the cell and a polarizer in order to further improve the viewing angle characteristic in a direction of 45 degrees relative to the polarization axis of the polarizer.

(2) PALC

For example, Japanese Laid-Open Publication No. 1-217396 discloses a plasma-addressed liquid crystal (PALC) display device. The PALC display device includes a plasma substrate. The plasma substrate is defined by a substrate and a thin dielectric layer. A space between the substrate and the thin dielectric layer accommodates ribs for dividing the space into a plurality of plasma chambers. The plasma chambers each accommodate an anode electrode and a cathode electrode. A change in the plasma state of a noble gas contained in the plasma chamber provides a switching function. The PALC display device further includes a counter substrate having a counter electrode. The counter substrate and the dielectric layer interpose a liquid crystal layer. A voltage is applied to the liquid crystal layer to perform display.

The PALC technology is favorably expected to be applied to large-screen display due to a simple structure realized by the technology, but has a problem in the viewing angle characteristic since the liquid crystal material is used as an optical switch for display.

In order to solve the problem, Japanese Laid-Open Publication Nos. 9-19738 and 10-186331 disclose applying an AMS mode to a PALC display device.

Hereinafter, the problems of the above-described conventional LCD devices will be described.

(1) Contrast

The hybrid ASM mode described in Japanese Laid-Open Publication No. 7-318940 includes a structure having a wall in a lattice pattern on an electrode. Accordingly, the alignment of a portion of the liquid crystal molecules which is above the wall is not sufficient in response to the voltage application. Thus, the transmittance of the corresponding area is not lowered. As a result, a sufficiently high contrast is not provided. As a solution to the problem, a structure having a black wall in a lattice pattern (black matrix) is provided to shield the area from light. In an LCD device of an axially symmetrical alignment mode, the alignment of the liquid crystal molecules is determined by the alignment force provided by the wall of the structure. Since an alignment force cannot regulate the alignment of the liquid crystal molecules in a large pixel area of 200 μm or greater, such a large pixel area is divided into smaller regions and the structure having a black wall in a lattice pattern is formed in correspondence with the smaller regions. As a result, the numerical aperture is reduced.

(2) Response Speed

In the conventional ASM mode LCD devices, two substrates are both covered with a horizontal alignment layer or a vertical alignment layer. Since the alignment is stable when no voltage is applied, the response speed of the liquid crystal molecules when a voltage is applied is significantly lower than the response speed when the voltage is dropped. Moreover, a portion of the liquid crystal layer on the wall is less likely to be supplied with a voltage than the rest of the liquid crystal layer. Accordingly, when a voltage is applied to the entire liquid crystal layer, the portion on the wall has a lower response speed than the rest of the liquid crystal layer.

(3) Application of the ASM Mode to PALC Display Devices

There are the following problems in applying the ASM mode to the PALC display devices.

(i) An n-type liquid crystal material used in an ASM mode operates in a normally black mode; i.e., is put into a white state (light transmission state) by voltage application. In the case of a PALC display device, a voltage is applied to a liquid crystal layer by striped transparent electrodes as shown in FIG. 19. The applied voltage is as high as several tens of volts. Due to such a high level of voltage, a capacitance coupling occurs between ON-state electrodes and OFF-state electrodes (i.e., a transverse electric field) and thus puts the edge portions of the OFF-state electrodes into an ON state as indicated with reference numeral 19a. Pixel areas corresponding to such portions allow light transmission. Such a phenomenon is conspicuous in highly precise liquid crystal panels such as, for example, high definition panels, and influences the normally black mode display as a color shift.

(ii) In the case of PALC display devices, the thickness of the liquid crystal layer (cell thickness) is set to be larger than that of the display devices including TFTs or the like, in order to guarantee application of a sufficient level of voltage to the liquid crystal layer. Accordingly, the response speed is lower whether a p-type or n-type liquid crystal material is used.

SUMMARY OF THE INVENTION

The present inventors performed active researches in order to provide an LCD device which realizes stable axially symmetrical alignment without using a photo-curable monomer to provide a large viewing angle, which prevents reduction in the numerical aperture to provide high contrast display even though pixel areas are divided, and which has a high response speed. As a result, they have found that the above-described LCD device is realized by providing a convex-concave structure for regulating the alignment of liquid crystal molecules on a electrode in a hybrid-type ASM mode having a vertical alignment layer on one substrate and a horizontal alignment layer on the other substrate. The present inventors also studied on a device without a horizontal alignment layer in an attempt to reduce the number of elements of the device. The present inventors also found that some of the elements which are usually included in an LCD device are usable as the convex-concave structure for regulating the alignment.

According to one aspect of the invention, a liquid crystal display device includes a first substrate having a vertical alignment layer provided thereon; a second substrate having a horizontal alignment layer provided thereon; a liquid crystal layer including liquid crystal molecules interposed between the first substrate and the second substrate; and a concave-convex structure for regulating an alignment direction of the liquid crystal molecules and a transparent conductive layer provided on the concave-convex structure, the concave-convex structure being provided on one of the first substrate and the second substrate with one of the vertical alignment layer and the horizontal alignment layer interposed therebetween. The liquid crystal molecules in the vicinity of the horizontal alignment layer are aligned in an axially symmetrical manner when no voltage is provided, and the liquid crystal molecules in the liquid crystal layer are aligned substantially vertically relative to the first substrate and the second substrate when a voltage is applied.

In one embodiment of the invention, the convex-concave structure is provided on the second substrate with the horizontal alignment layer interposed therebetween.

According to another aspect of the invention, a liquid crystal display device includes a first substrate; a second substrate having a vertical alignment layer provided thereon; a liquid crystal layer including liquid crystal molecules interposed between the first substrate and the second substrate; a concave-convex structure for regulating an alignment direction of the liquid crystal molecules and a transparent conductive layer provided on the concave-convex structure, the concave-convex structure being provided on the first substrate, and the transparent conductive layer being in contact with the liquid crystal layer. The liquid crystal molecules in the vicinity of the transparent conductive layer are aligned in an axially symmetrical-manner when no voltage is provided, and the liquid crystal molecules in the liquid crystal layer are aligned substantially vertically relative to the first substrate and the second substrate when a voltage is applied.

In one embodiment of the invention, the liquid crystal layer is a p-type liquid crystal material.

In one embodiment of the invention, the convex-concave structure has convex portions provided in a lattice pattern.

In one embodiment of the invention, the convex-concave structure has convex portions provided in a checkered pattern.

In one embodiment of the invention, the convex-concave structure has concave portions provided in a lattice pattern.

In one embodiment of the invention, the convex-concave structure has concave portions provided in a checkered pattern.

In one embodiment-of the invention, the liquid crystal display device further includes a phase plate having a negative refractive index anisotropy outside at least one of the first substrate and the second substrate.

In one embodiment of the invention, the liquid crystal display device further includes a plurality of switching elements, and a plurality of source lines and a plurality of gate lines for driving the plurality of switching elements. The plurality of switching elements, the plurality of source lines and the plurality of gate lines are provided on one of the first substrate and the second substrate. The plurality of source lines and the plurality of gate lines act as a convex-concave structure having convex portions.

In one embodiment of the invention, the liquid crystal display device further includes a layer having a plurality of portions of different colors and a black matrix portion having a greater height than a height of the plurality of portions of different colors, wherein the black matrix portions act as a convex-concave structure having convex portions.

In one embodiment of the invention, the black matrix portions are formed of a resin.

According to still another aspect of the invention, a plasma-addressed liquid crystal display device is provided. The first substrate of the above-described liquid crystal display device is formed of a plasma section. The plasma section includes a third substrate; a dielectric layer interposed between the second substrate and the third substrate; a plurality of ribs for dividing a space between the dielectric layer and the third substrate into a plurality of plasma chamber containing a noble gas; and an anode electrode and a cathode electrode accommodated in each of the plasma chambers. Voltage switching is performed by changing the plasma state of the noble gas.

According to still another aspect of the invention, a plasma-addressed liquid crystal display device is provided. The second substrate of the liquid crystal display device is formed of a plasma section. The plasma section includes a third substrate; a dielectric layer interposed between the first substrate and the third substrate; a plurality of ribs for dividing a space between the dielectric layer and the third substrate into a plurality of plasma chamber containing a noble gas; and an anode electrode and a cathode electrode accommodated in each of the plasma chambers. Voltage switching is performed by changing the plasma state of the noble gas.

According to still another aspect of the invention, a plasma-addressed liquid crystal display device is provided. The second substrate of the liquid crystal display device is formed of a plasma section. The plasma section includes a third substrate; a dielectric layer interposed between the first substrate and the third substrate; a plurality of ribs for dividing a space between the dielectric layer and the third substrate into a plurality of plasma chamber containing a noble gas; and an anode electrode and a cathode electrode accommodated in each of the plasma chambers. Voltage switching is performed by changing the plasma state of the noble gas.

According to still another aspect of the invention, a plasma-addressed liquid crystal display device includes a first substrate; a second substrate; a dielectric layer provided between the first substrate and the second substrate; a liquid crystal layer including liquid crystal molecules provided between the second substrate and the dielectric layer; a plurality of ribs for dividing a space between the dielectric layer and the first substrate into a plurality of plasma chambers containing a noble gas; an anode electrode and a cathode electrode accommodated in each of the plurality of plasma chambers; a vertical alignment layer provided on one of the second substrate and the dielectric layer so as to be in contact with the liquid crystal layer; a horizontal alignment layer provided on the other of the second substrate and the dielectric layer so as to be in contact with the liquid crystal layer; and a convex-concave structure for regulating an alignment direction of the liquid crystal molecules, the convex-concave structure being provided on one of the second substrate and the dielectric layer with one of the vertical alignment layer and the horizontal alignment layer interposed therebetween. The liquid crystal molecules in the vicinity of the horizontal alignment layer are aligned in an axially symmetrical manner when no voltage is applied, and the liquid crystal molecules in the liquid crystal layer are aligned substantially vertically relative to the second substrate and the dielectric layer when a voltage is applied. Voltage switching is performed by changing the plasma state of the noble gas.

According to still another aspect of the invention, a plasma-addressed liquid crystal display device includes a first substrate; a second substrate; a dielectric layer provided between the first substrate and the second substrate; a liquid crystal layer including liquid crystal molecules provided between the second substrate and the dielectric layer; a plurality of ribs for dividing a space between the dielectric layer and the first substrate into a plurality of plasma chambers; an anode electrode and a cathode electrode accommodated in each of the plurality of plasma chambers containing noble gas; a convex-concave structure for regulating an alignment direction of the liquid crystal molecules and a transparent conductive layer provided on the convex-concave structure, the convex-concave structure being provided on the second substrate, and the transparent conductive layer being in contact with the liquid crystal layer; and a vertical alignment layer provided on the dielectric layer. The liquid crystal molecules in the vicinity of the transparent conductive layer are aligned in an axially symmetrical manner when no voltage is applied, and the liquid crystal molecules in the liquid crystal layer are aligned substantially vertically relative to the second substrate and the dielectric layer when avoltage is applied. Voltage switching is performed by changing the plasma state of a noble gas.

According to the present invention, the liquid crystal molecules in the vicinity of the inclined convex-concave structure are aligned along the inclination. Therefore, stable axially symmetrical alignment is obtained simply by injecting the liquid crystal material, without using a photo-curable monomer. Due to provision of a vertical alignment layer on one substrate and a horizontal alignment layer on the other substrate, the liquid crystal molecules are prepared to be tilted when no voltage is applied. Therefore, the response speed is higher than the conventional devices having a vertical alignment layer or a horizontal alignment layer on both of the substrates. Since the convex-concave structure is provided between a transparent conductive layer and the substrate, a portion of the liquid crystal layer on a convex portion of the convex-concave structure is supplied with a sufficient voltage to be tilted, thus avoiding contrast reduction. Even in the case of a device having a large pixel area, the pixel area can be divided into a plurality of smaller regions without reducing the numerical aperture when the convex-concave structure is light-transmissive.

In an embodiment where the convex-concave structure is provided on the substrate having a horizontal alignment layer, the alignment of the liquid crystal molecules are stabilized.

In an embodiment where a p-type liquid crystal material is used, the liquid crystal molecules in the vicinity of the horizontal alignment layer are aligned in an axially symmetrical manner when no voltage is applied. When a voltage is applied, the liquid crystal molecules in the liquid crystal layer are aligned substantially vertically to the substrates. By providing polarizers so that the polarization axes thereof are perpendicular to each other, the device operates in a normally white mode in which the transmittance is maximized when no voltage is applied. Thus, bright display is obtained with less power consumption.

In an embodiment where the convex or concave portions of the convex-concave structure are arranged in a lattice pattern or a checkered pattern, the size of regions in which the liquid crystal molecules are aligned in an axially symmetrical manner corresponds to the pixel area.

In an embodiment where a phase plate having a negative refractive index anisotropy is provided between the cell and the polarizer, the viewing angle characteristic in the direction of 45 degrees with respect to the polarization axis of the polarizer is further improved.

A transparent conductive layer (ITO or the like) has a surface free energy sufficiently large to align the liquid crystal molecules in the vicinity thereof in a horizontal direction. Therefore, the transparent conductive layer can make a separate horizontal alignment layer unnecessary.

In a TFT LCD device, the gate lines and source lines are provided so as to intersect each other and can form a stepped concave-convex structure shown in FIG. 16 described below. Thus, a separate convex-concave structure for regulating the alignment does not need to be formed with expensive photolithography or the like. Nor does the convex-concave structure formed of the gate lines and source lines reduce the numerical aperture. The metal materials, transparent conductive materials, and glass used in the TFT LCD devices have a surface free energy sufficiently large to align the liquid crystal molecules in the vicinity thereof in a horizontal direction. Therefore, a separate horizontal alignment layer can be eliminated.

In an embodiment where a color filter substrate having a black matrix higher than a color layer is included as shown in FIG. 15 described below, the black matrix can be used as a convex-concave structure. Such a black matrix does not reduce the numerical aperture, and can be produced by use of a resist material.

In a PALC display device, even when the pixel area is divided, the numerical aperture is not reduced as long as the convex-concave structure is formed of a light-transmissive material. The use of the hybrid-type ASM mode provides a larger viewing angle and a higher response speed. Since the PALC display device is usually operated at a relatively high voltage, provision of the convex-concave structure on the transparent conductive layer does not reduce the contrast. Since it is difficult to provide a convex-concave structure on a dielectric layer of the plasma substrate for production reasons, the convex-concave structure is preferably provided on the substrate facing the dielectric layer with the liquid crystal layer interposed therebetween.

In the case of a PALC display device also, the transparent conductive layer can be used as a horizontal alignment layer, and the black matrix can be used as convex portions of the convex-concave structure. Thus, the number of elements can be decreased to reduce the cost.

Thus, the invention described herein makes possible the advantages of providing a liquid crystal display device, and a PALC display device using such an LCD device, which realizes stable axially symmetrical alignment without using a photo-curable monomer to provide a large viewing angle, which prevents reduction in the numerical aperture to provide high contrast display even though pixel areas are divided, and which has a high response speed, at a low cost.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

(Basic Structure)

Figure 1:
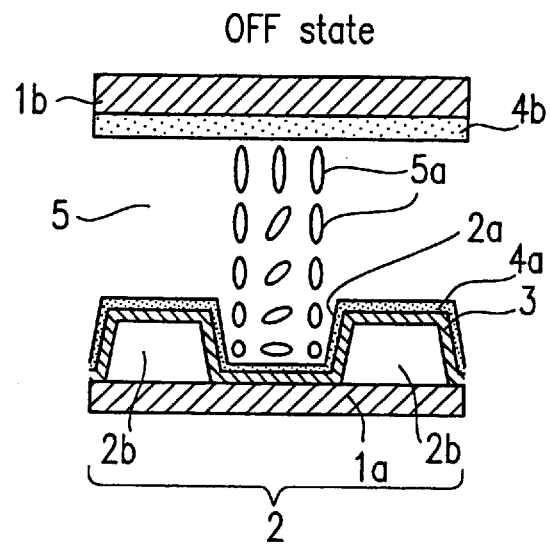
FIG. 1 is a cross-sectional view of an LCD device according to the present invention.

FIG. 1 shows a basic structure of an LCD device according to the present invention.

The LCD device includes substrates 1a and 1b, and a liquid crystal layer 5 interposed between the substrates 1a and 1b. A convex-concave structure 2 for regulating the alignment of liquid crystal molecules 5a included in the liquid crystal layer 5 is provided on the substrate 1a. In the example shown in FIG. 1, the convex-concave structure 2 includes a plurality of convex portions 2b. A transparent electrode layer 3 and a horizontal alignment layer 4a are provided on the substrate 1a so as to cover the convex-concave structure 2. A vertical alignment layer 4b is provided on the substrate 1b.

Figure 2A:
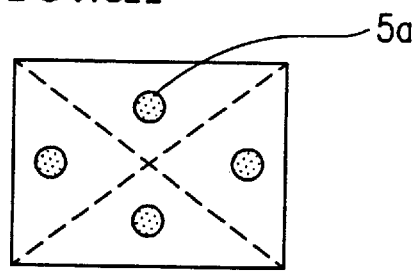
FIGS. 2A, 2B and 2C schematically show the alignment state of liquid crystal molecules in different portions of the LCD device according to the present invention.
Figure 2B:
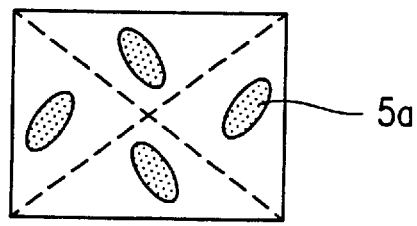
Figure 2C:
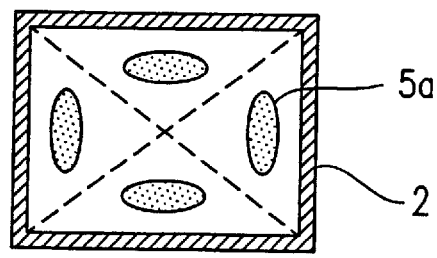

A liquid crystal material used for the liquid crystal layer 5 has a dielectric anisotropy ($\Delta\epsilon>0$; either including or excluding a chiral dopant). When the liquid crystal material is injected between the substrates 1a and 1b, the liquid crystal molecules 5a are aligned as shown in FIGS. 2A, 2B and 2C. More specifically, as shown in FIG. 2C, the liquid crystal molecules in a bottom portion (i.e., in the vicinity of the convex-concave structure 2 covered with the horizontal alignment layer 4a (FIG. 1)) are aligned along an inclined surface 2a of the convex-concave structure 2. Therefore, the liquid crystal molecules 5a are aligned concentrically. When the liquid crystal material includes a chiral dopant, the liquid crystal molecules 5a in an intermediate portion are twisted toward the substrate 1b covered with the vertical alignment layer 4b as shown in FIG. 2B. In a top portion in the vicinity of the substrate 1b, as shown in FIG. 2A, the liquid crystal molecules 5a are aligned substantially vertically to the substrate 1b.

In this manner, a hybrid-type axially symmetrical alignment is obtained by merely injecting a liquid crystal material. Such an LCD device solves the above-mentioned problems as described below.

(1) Operation

When no voltage is applied, the liquid crystal molecules 5a are aligned in an axially symmetrical manner and thus light is transmitted through the cell. When a voltage is applied, the liquid crystal molecules 5a are tilted substantially vertical relative to the substrates 1a and 1b, and thus a black display state is obtained where polarization axes of polarizers are perpendicular to each other. In other words, the LCD device according to the present invention is a normally white mode device. Such a normally white mode device is suitable to provision of bright display with less power consumption, since the light transmittance is maximized when no voltage is applied. The normally white mode device also has an advantage when applied to a PALC display device that even though edge portions of OFF-state electrodes are put into an ON state, such phenomenon does not influence the display as a color shift.

(2) Response Speed

In the above-mentioned alignment state in which the alignment directions of the liquid crystal molecules are different in the vicinity of the two substrates, a specific electrooptical characteristic is exhibited.

Since the liquid crystal molecules 5a are already distorted when no voltage is applied, the liquid crystal molecules 5a are likely to move when a voltage is applied. In more detail, the liquid crystal molecules 5a are already aligned in a direction closer to the direction in which the liquid crystal molecules 5a should be aligned when a voltage is applied, and thus have no resistance against the voltage applied. Accordingly, the response speed is higher than in the conventional n-type or p-type ASM mode LCD devices in which the liquid crystal molecules are aligned in the same direction in the vicinity of both two substrates.

(Cell Structure)

An LCD device according to the present invention preferably includes (1) a convex-concave structure, (2) a vertical alignment layer and a horizontal alignment layer, (3) a transparent electrode on the convex-concave structure, and (4) a liquid crystal layer, which will be described below in detail.

(1) Convex-concave Structure (i) Planar Shape of the Convex-concave Structure

The convex-concave structure determines the initial alignment of the liquid crystal molecules (i.e., the alignment when no voltage is applied).

Figure 3A:
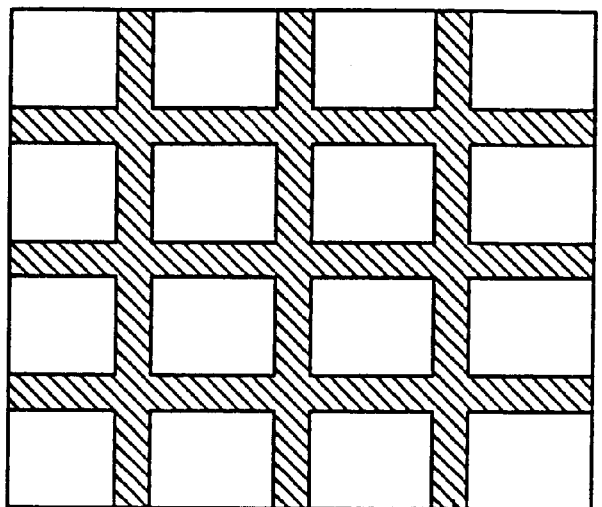
FIGS. 3A and 3B are plan views illustrating representative patterns of a convex-concave structure according to the present invention.
Figure 3B:
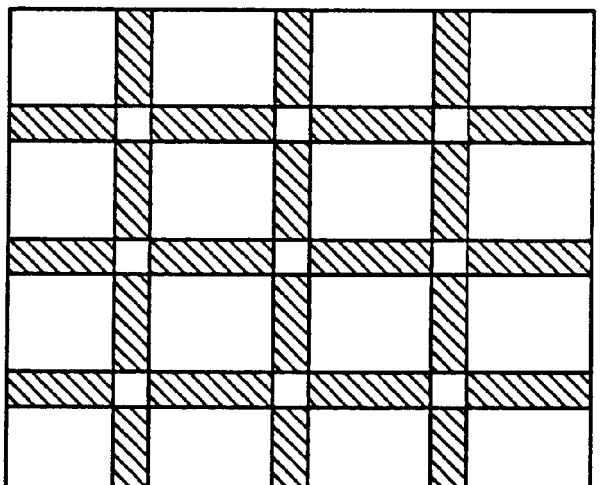
Figure 4A:
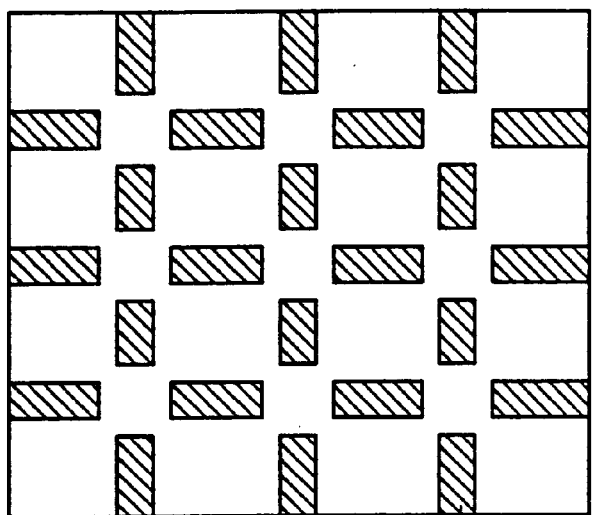
FIGS. 4A and 4B are plan views illustrating other representative patterns of a convex-concave structure according to the present invention.
Figure 4B:
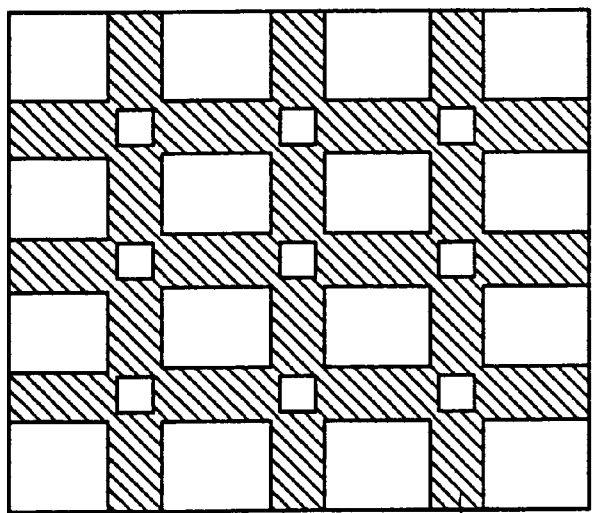

In order to form each of the regions in which the liquid crystal molecules are aligned in an axial symmetrical manner so as to have a size corresponding to a pixel area, sections defined by convex or concave portions of the convex-concave structure are preferably substantially separate from one another. In the case where the sections defined by the convex or concave portions are continuous especially in a portion where the liquid crystal molecules are aligned in an axially symmetrical manner, the axially symmetrical alignment patterns are continuous over adjacent pixel areas. This phenomenon spoils the stable axially symmetrical alignment, and thus provides the display with a rough appearance. The convex-concave structure can have, for example, a lattice pattern as shown in FIG. 3A, a checkered pattern as shown in FIG. 3B, or a hexagonal pattern. The lattice pattern and the checkered pattern are preferable. The sections defined by the convex-concave portions do not need to be completely enclosed by the convex-concave portions, and can be continuous at corners as shown in FIGS. 4A and 4B. The convex-concave structure does not need to include a single pattern, and can include a combination of different patterns or a combination of different size portions. The pattern can be asymmetrical by the provision of TFTs or the like.

In the case where the convex-concave structure is formed of a transparent material, a large pixel area can be divided into a plurality of regions without significantly reducing the transmittance of the LCD device. In order to prevent moire fringes, the large pixel area is preferably divided so that the pitch of the pixel area is a number obtained by multiplying the pitch of the divided regions by an integer. In the case where the convex-concave structure is formed of a component already included in the LCD device, the material of convex-concave structure can be non-transparent since such a convex-concave structure does not reduce the numerical aperture of the LCD device.

(ii) Height or Depth of the Convex-concave Structure

The height or depth of the convex-concave structure varies whether the structure has convex portions or concave portions.

(a) Structure Having Convex Portions (Convex Structure)

A desirable range of the height of convex structure depends on the cell thickness. Although not specifically limited according to the present invention, the height is preferably 10% to 60% of the cell thickness in consideration of the ease of injection of the liquid crystal material. When the height of the concave structure is less than 10% of the cell thickness, the initial axially symmetrical alignment of the liquid crystal molecules does not occur. When the height of the concave structure is more than 60% of the cell thickness, the passage through which the injected liquid crystal material passes is reduced in size and thus the injection period is extended.

When conductive lines for TFTs, for example, metal wires are used as the convex structure, the inclination of a side surface of the convex portions (i.e., wires) is relatively steep. In such a case, the height of the structure can be only 1 μm to 0.5 μm to regulate the alignment of the liquid crystal molecules.

In the case where such a convex structure is applied to a PALC display device, the liquid crystal molecules are aligned as follows. When a voltage is applied, the liquid crystal molecules in the pixel areas are first aligned vertically relative to two substrates. Then, in accordance with this alignment, the liquid crystal molecules on the convex portions are aligned.

Figure 6A:
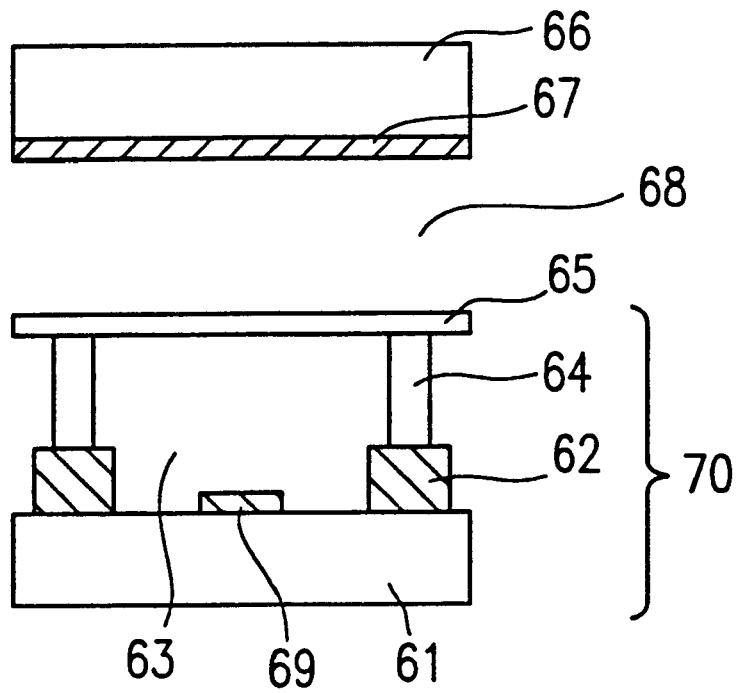
FIG. 6A is a cross-sectional view of a PALC display device illustrating voltage application.
Figure 6B:
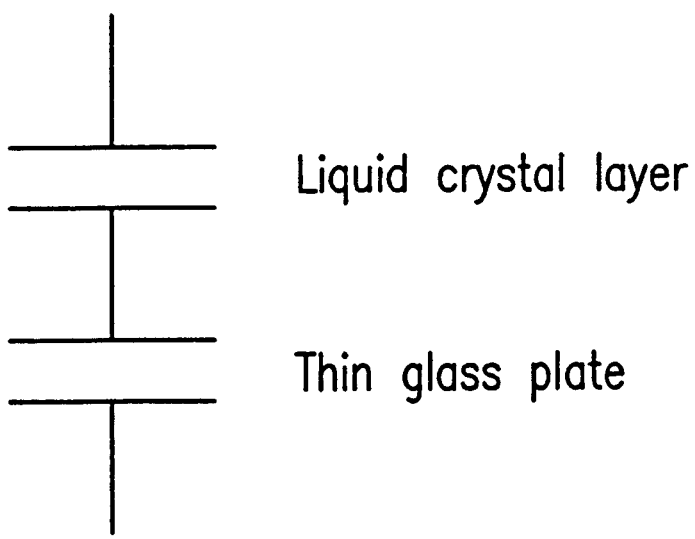
FIG. 6B shows an equivalent circuit of the structure shown in FIG. 6A.

Such a manner of alignment control is especially advantageous to PALC display devices. As shown in FIGS. 6A and 6B, a voltage is applied across a thin glass plate 65 and a liquid crystal layer 68. Accordingly, the voltage applied to the liquid crystal layer 68 (VLC) is as in expression (A). Thus, as the liquid crystal layer 68 is thicker, the voltage is transmitted to the liquid crystal layer 68 more easily.

$$VLC = V/(1 + dG \cdot \in LC/dLC \cdot \in G) \tag{A}$$

where V is the level of an external voltage applied across the thin glass plate 65 and the liquid crystal layer 68, dG is the thickness of the thin glass plate 65, $\in LC$ is the dielectric constant of the liquid crystal material, dLC is the thickness of the liquid crystal layer 68, and $\in G$ is the dielectric constant of the thin glass plate 65.

Briefly describing the structure shown in FIG. 6A, the liquid crystal layer 68 is interposed between a substrate 66 and a plasma substrate 70 (plasma section). The plasma substrate 70 includes the thin glass plate 65 (dielectric layer), a substrate 61, plasma electrodes 62 provided on the substrate 61, and ribs 64 provided on the plasma electrodes 62. A transparent electrode 67 is provided on the substrate 66. A space between the thin glass plate 65 and the substrate 61 is divided into a plurality of plasma chambers 63 (only one is shown in FIG. 6A) by the ribs 64. FIG. 6B shows an equivalent circuit of the structure shown in FIG. 6A.

In the PALC display device according to the present invention, the positional relationship between the transparent electrode and the convex structure is not as strictly restricted as in the conventional TFT LCD devices. The transparent electrode can be provided on the convex structure, or the convex structure can be provided on the transparent electrode. Providing the transparent electrode on the convex structure is preferable since a higher contrast is obtained.

(b) Structure Having Concave Portions (Concave Structure)

The conditions for the depth of the concave structure are different from those for the height of the convex structure since the ease of injection does not need to be considered for the concave structure.

Figure 5A:
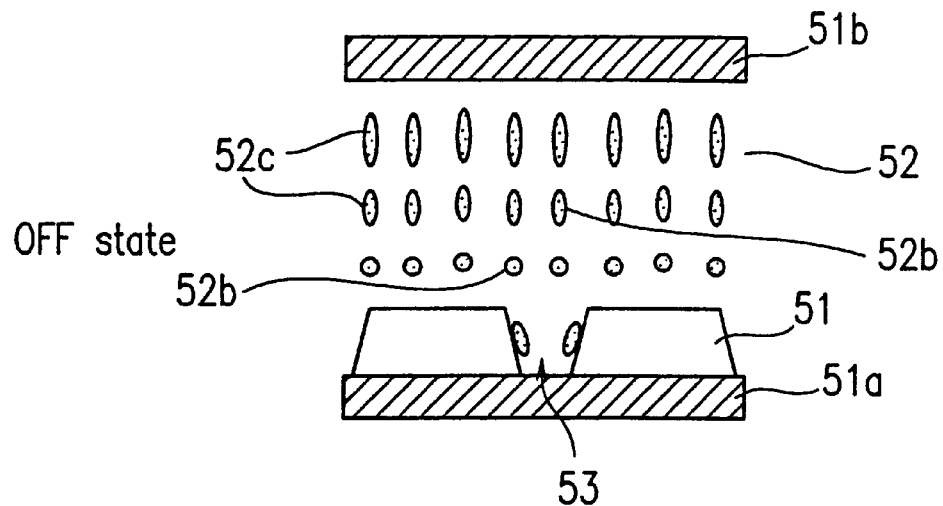
FIGS. 5A, 5B and 5C are cross-sectional views illustrating the manner by which the liquid crystal molecules are aligned in a PALC display device according to the present invention.
Figure 5B:
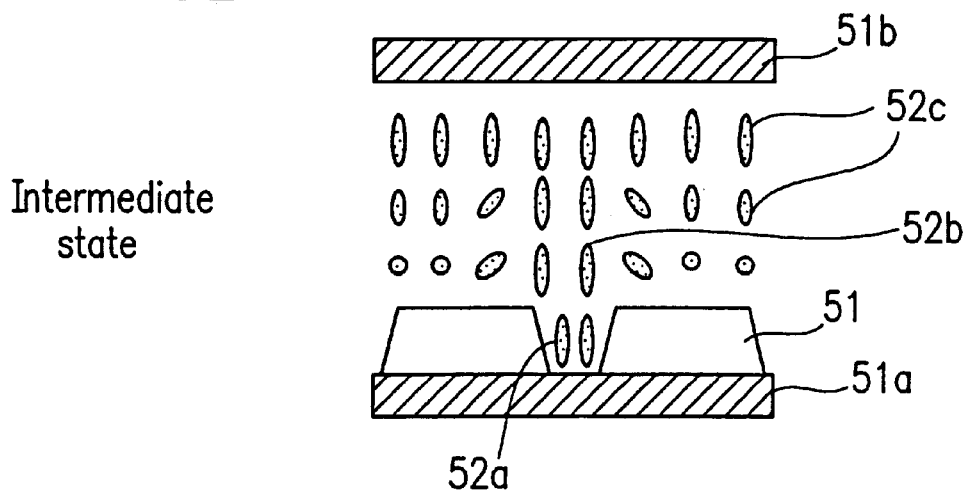
Figure 5C:
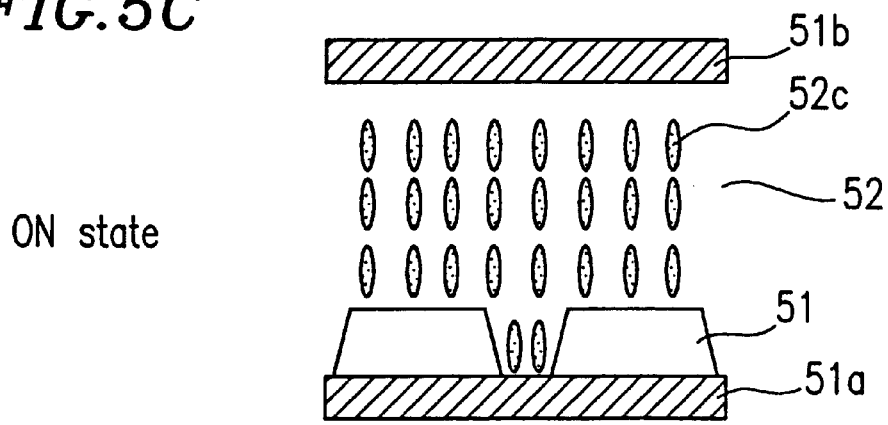

In the case where a concave structure is applied to a PALC display device, the liquid crystal molecules are aligned as shown in FIGS. 5A, 5B and 5C. FIG. 5A shows the alignment of the liquid crystal molecules in an OFF state. When a voltage is applied, liquid crystal molecules 52a in a concave portion (groove) 53 of a concave structure 51 are first aligned vertically relative to substrates 51a and 51b as shown in FIG. 5B. In accordance with this alignment, liquid crystal molecules 52b above the groove 53 are aligned. Then, as shown in FIG. 5C, liquid crystal molecules 52c in the remaining portion are influenced by such alignment. Thus, the liquid crystal molecules in the entire liquid crystal layer 52 are aligned. In FIGS. 5A, 5B and 5C, a transparent electrode and a horizontal alignment layer provided on the concave structure 51 and a vertical alignment layer provided on the substrate 51b are omitted for simplicity.

Such a manner of alignment control is especially advantageous to PALC display devices. As shown in FIGS. 6A and 6B, a voltage is applied across the thin glass plate 65 and the liquid crystal layer 68. Accordingly, the voltage applied to the liquid crystal layer 68 (VLC) is as in expression (A) above. Thus, as the liquid crystal layer 68 is thicker, the voltage is transmitted to the liquid crystal layer 68 more easily.

Figure 7:
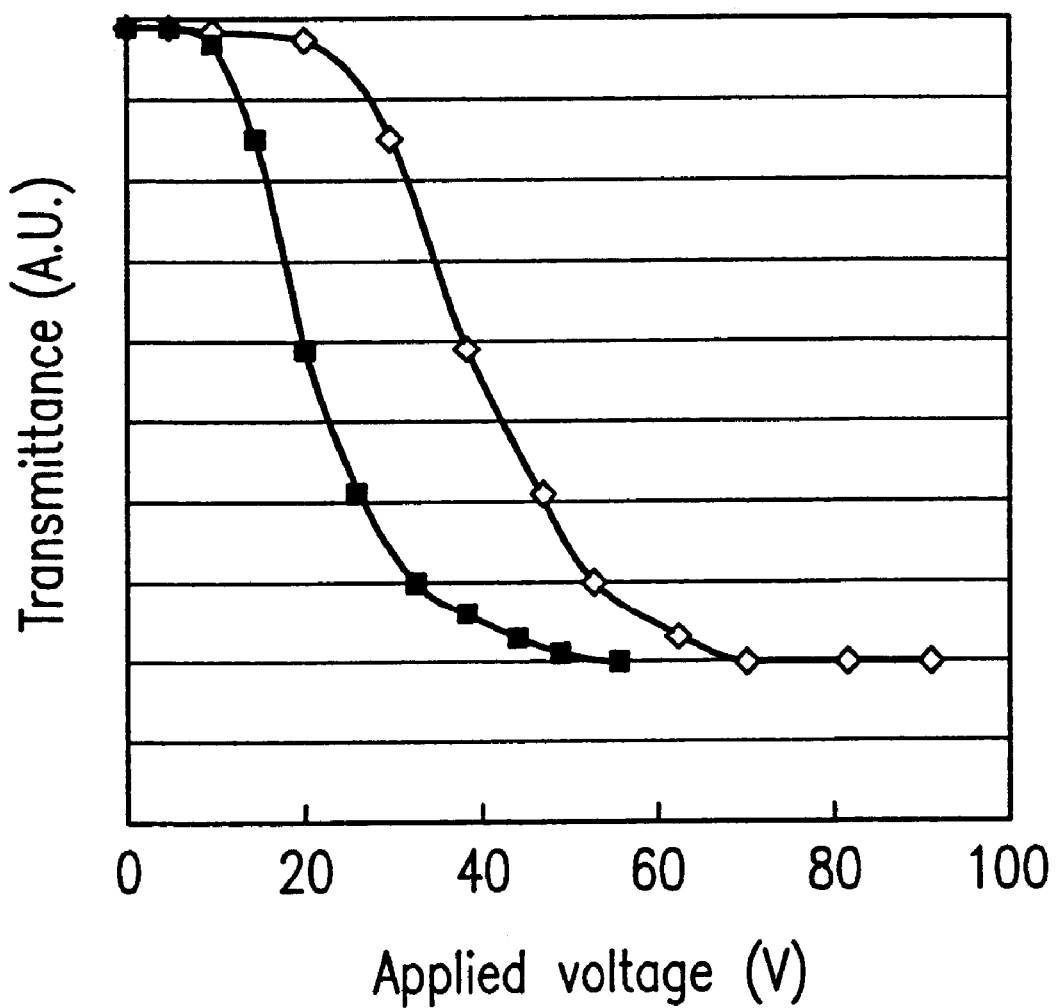
FIG. 7 is a graph illustrating a voltage-transmittance curve of an LCD device according to the present invention.

Accordingly, as shown in FIG. 7, in portions of the liquid crystal layer including grooves where the cell thickness is greater than the rest of the liquid crystal layer, the liquid crystal molecules respond to a low voltage to be tilted and thus increases the response speed. In FIG. 7, the curve with black squares indicates the voltage-transmission characteristic in the areas including grooves (where the cell thickness is greater). The curve with white squares indicates the voltage transmission characteristic in the remaining areas (where the cell thickness is smaller).

The response speed is also increased for gray scale display, which has the problem of low response speed in a conventional nematic LCD device. Such a low response speed is undesirable for fast-moving pictures. In the PALC display device according to the present invention, the apparent response speed in the gray scale is increased since the liquid crystal molecules in the groove are tilted at a gray scale voltage.

As the depth is greater, the difference in the voltage-transmittance curve between the grooves and the rest of the liquid crystal layer is increased. Since the liquid crystal molecules in the rest of the liquid crystal layer are driven by the influence of the liquid crystal molecules in the grooves, the driving voltage is lowered.

The depth of the groove is preferably about 1 μm to about 5 μm in consideration of the resist material for producing the concave structure, ease of coating, and light transmittance.

(iii) Inclination Angle of the Convex-concave Structure

The inclination angle of the convex-concave structure (angle made of the inclined surface of the convex-concave structure and the surface of the substrate above which the convex-concave structure is provided) plays an important role in determining the alignment state. The inclination angle is preferably 5 degrees or more. When the inclination angle is less than 5 degrees, regions in which the liquid crystal molecules are to be axially symmetrically aligned are not separated from one another.

When the convex-concave structure is formed of a non-light transmissive material such as, for example, metal or black resist, a larger inclination angle is more preferable for providing a stronger alignment control. The convex-concave structure can have a reverse-tapered shape with an inclination angle exceeding 90 degrees.

When the convex-concave structure is formed of a transparent material, an inclination angle of less than 45 degrees is undesirable. Since light leaks through liquid crystal molecules which failed to be tilted in the vicinity of the horizontal alignment layer, the contrast is lowered.

(iv) Method for Producing the Convex-concave Structure

The convex-concave structure is preferably produced by a photolithography technology using a resist material. The convex-concave structure can be formed to have an inclination by increasing the proximity gap (distance between the mask and the substrate) or extending the developing period. The convex-concave structure can also be formed to have an inclination by using a mask such as, for example, an emulsion mask, which allows slight light leakage at the edge of the pattern.

The number of elements of the LCD device can be reduced by using an element usually included in an LCD device as the convex-concave structure as follows.

(a) Use of a Black Matrix of a Color Filter Substrate

Figure 15:
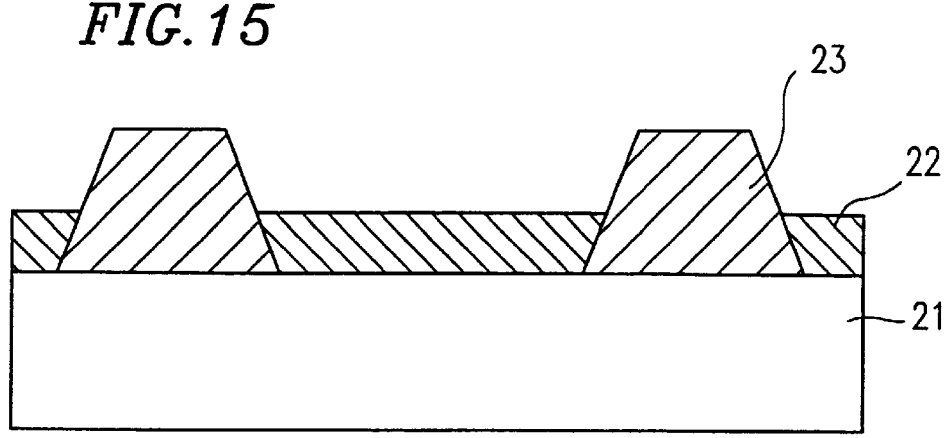
FIG. 15 is a cross-sectional view of a color filter substrate of an LCD device in Example 4.

FIG. 15 shows an example of a black matrix formed of a resin in a color filter substrate. A black matrix portion 23 is made higher than a color portion 22 so that the black matrix portion 23 can be used as convex portions for regulating the alignment. The black matrix portion 23 can be made higher than the color portion 22 by, for example, use of a resist.

Such a color filter substrate can be used either in a PALC display device and a TFT LCD device. In the case of a TFT LCD device, the TFT substrate needs to be sufficiently flat since the TFT substrate is coated with a vertical alignment layer. Accordingly, a dielectric layer is preferably provided between the pixel electrodes and the lines (source lines or gate lines) to improve the flatness of the TFT substrate.

(b) Use of Wires of TFT Substrate

Figure 16A:
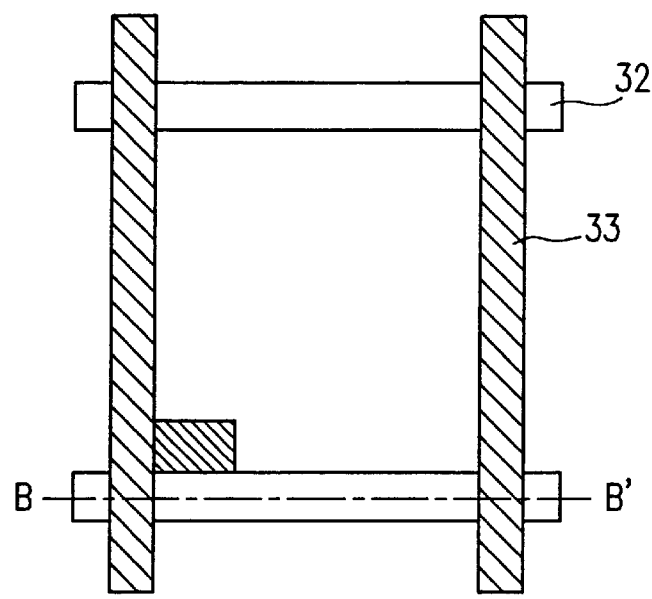
FIG. 16A is a plan view of a TFT substrate of an LCD device in Example 5.
Figure 16B:
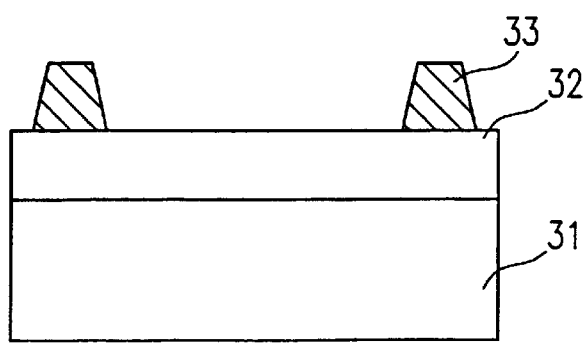
FIG. 16B is a cross-sectional view of FIG. 16A taken along line B–B'.
Figure 17:
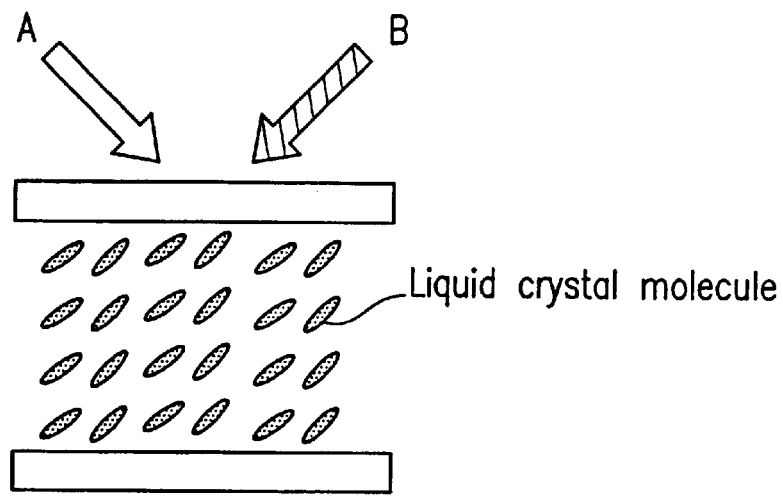
FIG. 17 is a cross-sectional view schematically showing the alignment of liquid crystal molecules in a conventional twisted nematic mode LCD device.
Figure 18A:
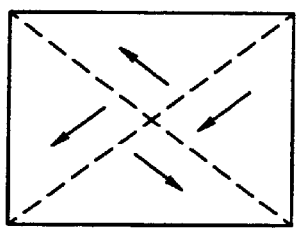
FIGS. 18A, 18B and 18C are plan views schematically showing the alignment in different portions of a liquid crystal layer of a conventional LCD device.
Figure 18B:
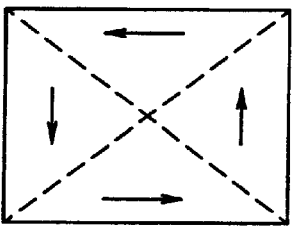
Figure 18C:
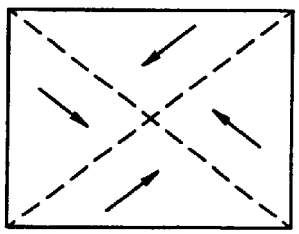
Figure 19:
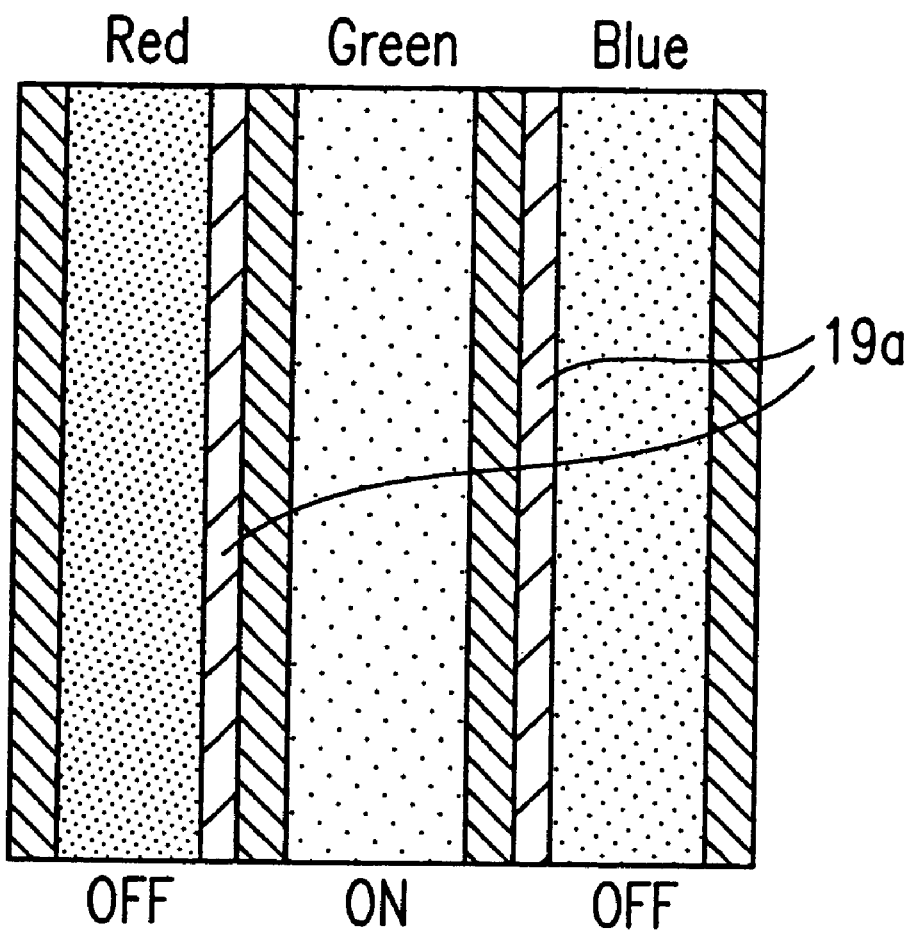
FIG. 19 is a plan view schematically showing crosstalk in a conventional PALC display device.

In a TFT LCD device, lines such as source lines and gate lines are also usable as a convex-concave structure. FIG. 16A is a schematic plan view of a TFT substrate, and FIG. 16B is a cross-sectional view of FIG. 16A taken along line B–B'. As shown in FIGS. 16A and 16B, gate lines 32 and source lines 33 are provided on a glass substrate 31 in an intersecting manner. This forms a stepped lattice-shaped structure, which can be used as the convex-concave structure.

In these ways, a high performance display device can be provided at low cost without using expensive photolithography for forming a convex-concave structure on the TFT substrate or a color filter substrate.

(2) Alignment Layers

Preferably, a horizontal alignment layer is provided on the substrate having a convex-concave structure thereon and a vertical alignment layer is provided on the other substrate for the following reason.

Figure 8A:
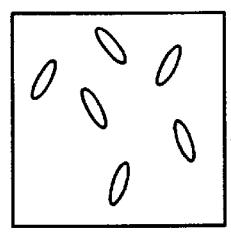
FIGS. 8A and 8C are plan views illustrating the function of alignment layers according to the present invention.
Figure 8C:
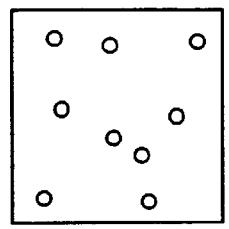
Figure 8B:
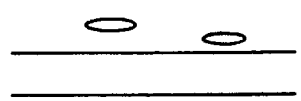
FIGS. 8B and 8D are cross-sectional views illustrating the function of alignment layers according to the present invention.
Figure 8D:
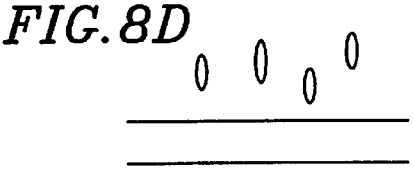

As shown in FIGS. 8A and 8B, in the vicinity of the horizontal alignment layer, the alignment direction of the liquid crystal molecules is not secured in a plane horizontal with respect to the substrate. Accordingly, in the case of, for example, the twisted nematic mode, the alignment is stabilized by rubbing or the like. As shown in FIGS. 8C and 8D, in the vicinity of the vertical alignment layer, the alignment direction of the liquid crystal molecules is determined without rubbing.

Figure 9A:
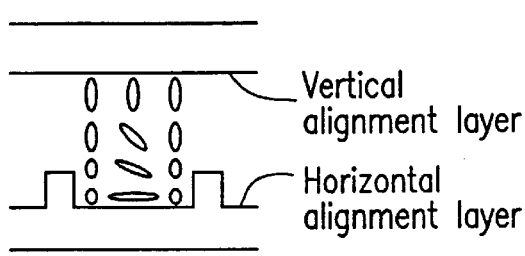
FIGS. 9A and 9B are cross-sectional views illustrating the function-of alignment layers according to the present invention.
Figure 9B:
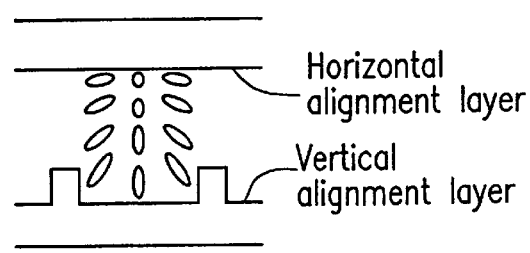

Accordingly, as shown in FIG. 9A, when a horizontal alignment layer is provided on the substrate having the convex-concave structure thereon and a vertical alignment layer is provided on the other substrate, the regions in which the liquid crystal molecules are axially symmetrical aligned are strictly regulated. As shown in FIG. 9B, when a vertical alignment layer is provided on the substrate having the convex-concave structure thereon and a horizontal alignment layer is provided on the other substrate, the regions in which the liquid crystal molecules are axially symmetrical aligned cannot be strictly regulated since the vertical alignment layer does not have a force for regulating the alignment direction in a plane horizontal to the substrate.

According to the present invention, the alignment direction can be regulated by the convex-concave structure. Separate processing for alignment such as rubbing is not necessary.

Alternatively, various elements on the substrate can be used as a horizontal alignment layer. For example, a metal material used for the electrodes, ITO (indium tin oxide) or other oxides used for the pixel electrodes, and glass have a surface free energy of as large as 40 din/cm or greater. Accordingly, the liquid crystal molecules in contact with these elements are horizontally aligned without a horizontal alignment layer. Thus, a high performance display device can be produced at low cost.

(3) Transparent Electrode

The transparent electrode is preferably provided on the convex-concave structure for the following reason.

When the convex-concave structure formed of a dielectric material is provided between the electrodes, the liquid crystal molecules on the convex-concave structure, to which a voltage is applied very easily, has a low response speed to the voltage application. Therefore, a sufficient level of contrast cannot be obtained in the corresponding area in the normally white mode at a generally used voltage. When the transparent electrode is formed below the convex-concave structure, the voltage is applied across the convex-concave structure and the liquid crystal layer. Thus, the amount of necessary driving voltage is raised.

The characteristics are significantly improved by providing the transparent electrode on the convex-concave structure and providing an alignment layer on the transparent electrode.

In the case of a PALC display device, the transparent electrode can be provided below the convex-concave structure without reducing the contrast as long as the height or depth of the convex-concave structure is reduced. The reason is that the voltage in the PALC display device, which is applied across the thin glass plate, is usually high. Specifically, the reduction in the contrast can be avoided by making the height or depth of the convex-concave structure about 0.1 μm to about 2 μm, preferably about 1 μm or less.

(4) Liquid Crystal Layer (i) Chiral Dopant

A chiral dopant is preferably included in the liquid crystal layer for improving the stability of the axially symmetrical alignment and characteristics of the LCD device. However, the axially symmetrical alignment is obtained with or without a chiral dopant.

Figure 10:
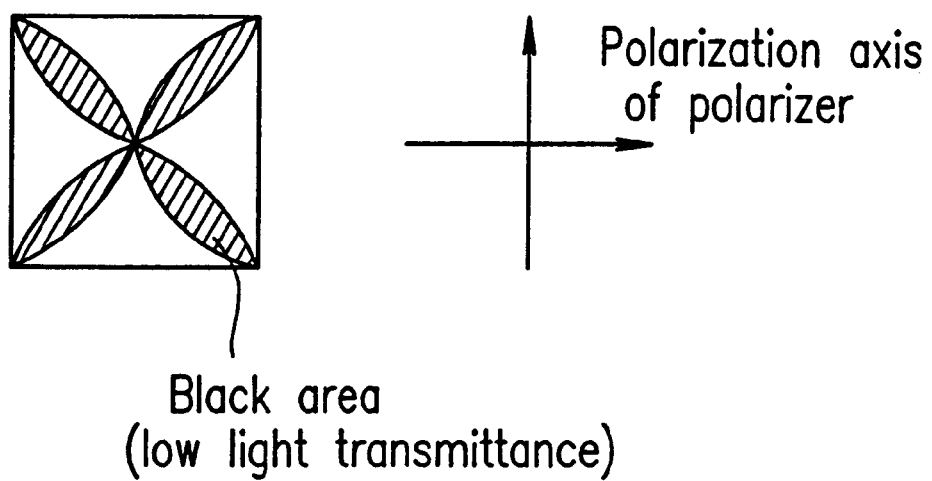
FIG. 10 is a plan view schematically showing the LCD device observed by a polarization microscope.

When the chiral dopant is not included, the liquid crystal molecules are tilted in two different directions in the vicinity of the convex portions, instead of one direction. The hatched area in FIG. 10 representing a black display state is an area where the polarization axis of the polarizer is significantly offset from the axis of the liquid crystal molecules in the vicinity of the substrate covered with a horizontal alignment layer (minimum transmittance is obtained at 45 degrees). When no chiral dopant is used, the transmittance is more conspicuously lowered in this area, which reduces the overall transmittance.

When a chiral dopant is not included, the LCD device basically operates in an ECB mode. Thus, color appears when a temperature changes. In order to avoid such a phenomenon, it is preferable to include a chiral dopant.

The transmittance is basically maximized when the chiral pitch is 90 degrees. The amount of the chiral dopant is not specifically limited since the chiral pitch may not reach 90 degrees in some cell structure even when the chiral dopant is included in an amount which theoretically realizes a chiral pitch of 90 degrees. The amount of the chiral dopant is preferably greater than in the conventional LCD device by about 10%, since a vertical alignment layer is provided on one of the substrates and thus the thickness of a portion of the liquid crystal layer which effectively contributes to the twist of the liquid crystal molecules is smaller.

(ii) d·Δn

The product of d (cell thickness) and Δn (refractive index anisotropy) determines the optical characteristics of the LCD device. The optimum value of d·Δn is different in an LCD device according to the present invention having both the vertical alignment and the horizontal alignment from that in an LCD device of a conventional alignment mode (e.g. twisted nematic mode or vertical alignment mode).

In an LCD device in which the liquid crystal molecules are aligned substantially horizontally, the apparent d·Δn is substantially the same as the actual d·Δn. In the LCD device of the hybrid mode according to the present invention, the apparent d·Δn is smaller than the actual d·Δn. Accordingly, the initial d·Δn is preferably set to be about 350 nm to about 550 nm. When the d·Δn is greater than the above-mentioned range, the viewing angle characteristic is deteriorated in the direction of 45 degrees relative to the polarization axis of the polarizer in the case where the liquid crystal molecules are tilted vertically to the substrates by voltage application. When the d·Δn is smaller than the above-mentioned range, the transmittance is excessively lowered, resulting in a darkening of the display.

In order to further improve the viewing angle characteristic in the direction of 45 degrees relative to the polarization axis of the polarizer, a phase plate having a negative refractive index anisotropy is preferably provided between the cell and the polarizer.

(iii) Dielectric Anisotropy

According to the present invention, a p-type liquid crystal material having a positive dielectric anisotropy is used in order to tilt the liquid crystal molecules substantially vertically to the substrate when a voltage is applied.

In the case where the present invention is applied to a TFT LCD device, a liquid crystal material having a high dielectric anisotropy as in the conventional twisted nematic mode is used to drive the liquid crystal molecules at a low voltage. Specifically, even a liquid crystal material having a dielectric anisotropy (Δ∈) of as high as 6 can be used.

In the case of a PALC display device, the dielectric constant ∈ (parallel) of the liquid crystal material is preferably 7 or less. A liquid crystal layer having an excessively large dielectric constant cannot be sufficiently supplied with a voltage as indicated by expression (A) due to the thin glass plate, as described above regarding the convex-concave structure.

Hereinafter, specific examples of the present invention will be described.

EXAMPLE 1

Convex Structure, ITO Electrode on the Wall

Figure 11A:
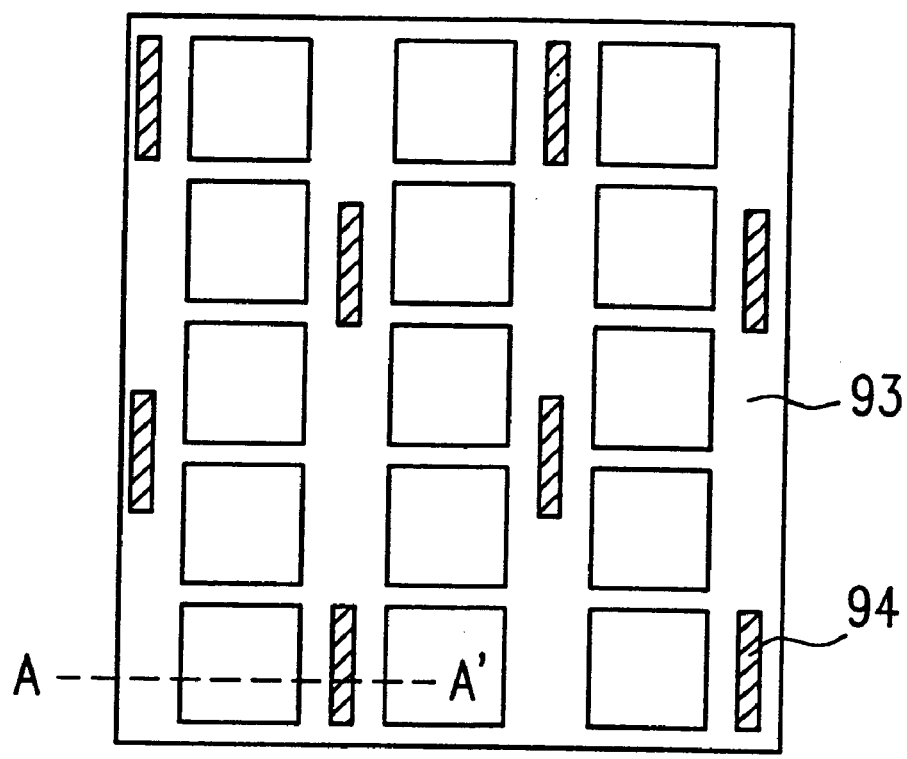
FIG. 11A is a plan view illustrating an LCD device in Example 1 according to the present invention.
Figure 11B:
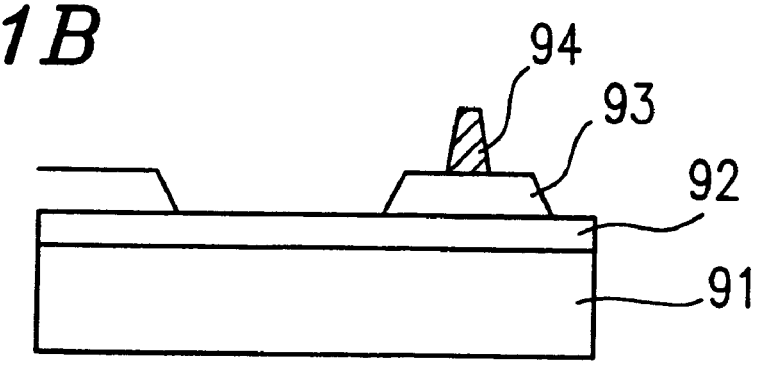
FIG. 11B is a partial cross-sectional view of an LCD device in comparative example 1.

An LCD device in Example 1 will be described with reference to FIGS. 11A and 11B. FIG. 11A is a schematic plan view of a substrate of an LCD device, and FIG. 11B is a cross-sectional view of FIG. 11 taken along line A–A'. Although FIG. 11B shows the structure of comparative example 1 described below, FIG. 11B will also be used for Example 1 for the sake of convenience. It should be noted that reference numeral 92 represents a transparent electrode which is provided on a glass substrate 91 in comparative example 1. In Example 1, a transparent electrode is provided on a convex structure 93 instead of on the glass substrate 91.

In Example 1, the convex structure 93 having a lattice pattern shown in FIG. 11A is formed on the glass substrate 91 by photolithography using an emulsion mask. The convex structure 93 is formed of a resist material. The convex structure 93 has a height of about 1.5 μm, a width of about 30 μm, and an inclination angle of about 20 degrees. A transparent electrode of ITO is formed on the convex structure 93, and column-like structures 94 having a height of about 3 μm are formed thereon as spacers. The cell thickness of a liquid crystal region defined by a wall (i.e., the convex structure 93 and the column-like structures 94) is about 4.5 μm. An overcoat layer can be provided between the transparent electrode and the convex structure 93. The resultant assembly is covered with a horizontal alignment layer (e.g., SE9742 produced by Nissan Chemical Industries, Ltd.).

Although not shown, a transparent electrode is provided on a counter substrate, and a vertical alignment layer (e.g., JALS-204 produced by Japan Synthetic Rubber Co., Ltd.) is provided thereon.

The two substrates are bonded together with a sealing material, and a liquid crystal material (Δ∈>0; e.g., ZLI2806: produced by Merck & Co.; chiral dopant is added so that the liquid crystal molecules are twisted at 100 degrees relative to the cell thickness) is injected into a space between the substrates. Thus, a liquid crystal cell is formed.

Figure 12:
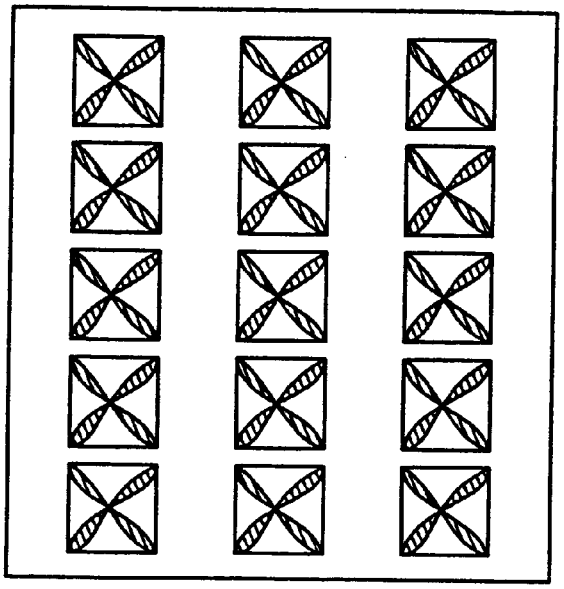
FIG. 12 is a plan view showing an LCD device in Example 1 observed in a polarization microscope.

FIG. 12 shows the above-produced liquid crystal cell observed by a polarization microscope. As shown in FIG. 12, the liquid crystal molecules were confirmed to be aligned in an axially symmetrical manner repeatedly. In FIG. 12, the liquid crystal molecules on the wall, which are not uniformly aligned, are omitted.

As can be appreciated from Example 1, axially symmetrical alignment is obtained without using a photo-curable monomer for securing the alignment.

Table 1 shows the electrooptical characteristics of the cell produced above, and the cells produced in comparative examples 1 and 2.

TABLE 1

| Parameter | Example 1 | Comparative example 1 | Comparative example 2 |
| --- | --- | --- | --- |
| Response speed (ms) | 15 | 18 | 30 |
| Contrast (7V) | 300:1 | 20:1 | 300:1 |
| Viewing angle characteristic (area in which contrast ratio > 10 in right-left direction) | 160° | 160° | 160° |

Comparative Example 1

Convex Structure; ITO Electrode Below the Wall

An LCD device in comparative example 1 will be described with reference to FIGS. 11A and 11B. A transparent electrode 92 is formed on a glass substrate 91, and a convex structure 93 having a lattice pattern shown in FIG. 11A is formed on the transparent electrode 92 by photolithography using an emulsion mask. The convex structure 93 is formed of a resist material. The sizes and shape of the convex structure 93 in comparative example 1 are the same as those in Example 1. Column-like structures 94 having a height of about 3 μm are formed on the convex structure 93 as spacers. Thereafter, a liquid crystal cell is formed in a similar manner to that in Example 1 thereafter. It is confirmed that axially symmetrical alignment occurs.

Comparative Example 2 n-type Axially Symmetrical Alignment Mode

A liquid crystal cell is produced in a similar manner as in Example 1 except that an n-type liquid crystal material is used.

Referring to Table 1, in comparative example 2, the response speed is insufficient with respect to the time period of one frame (16.7 ms), whereas in Example 1, the response speed is substantially the same as the time period of one frame. In comparative example 1, the contrast is insufficient since the liquid crystal molecules on the wall do not respond sufficiently to the voltage application. In Example 1, a high contrast is obtained. The viewing angle characteristics are satisfactory in Example 1 and comparative examples 1 and 2.

EXAMPLE 2

Convex Structure, ITO Electrode Below the Wall, Pixel Areas of PALC are Divided

Figure 13:
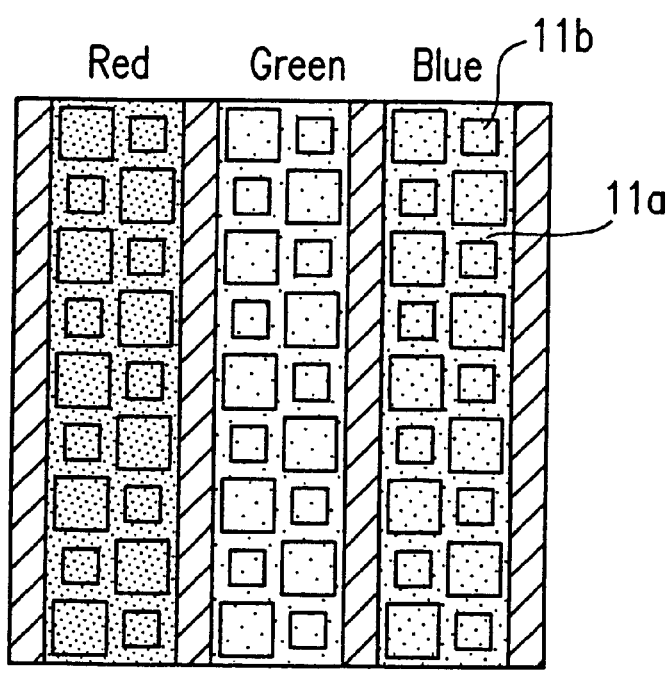
FIG. 13 is a plan view illustrating a convex structure of an LCD device in Example 2.

A light-transmissive convex structure having a checkered pattern shown in FIG. 13 is formed on a glass substrate, by photolithography using an emulsion mask, with a transparent electrode formed of ITO being interposed therebetween. The convex structure has a height of about 0.8 μm. The convex structure includes convex portions 11a in a checkered pattern, so that a pixel area including red, green and blue areas in FIG. 13 can be divided into smaller regions. On the convex portions 11a, column-like structures having a height of about 5.2 μm are formed as spacers by photolithography. The cell thickness of a liquid crystal region defined by the wall is about 6 μm. The resultant assembly is covered with a horizontal alignment layer (e.g., SE9742 produced by Nissan Chemical Industries, Ltd.).

As a counter substrate, a plasma substrate is used. The plasma substrate includes a substrate and a thin glass plate having a thickness of about 50 μm. A space between the substrate and the thin glass is divided into a plurality of plasma chambers by ribs. Each plasma chamber accommodates an anode electrode and a cathode electrode. A surface of the thin glass plate facing the liquid crystal layer is covered with a vertical alignment layer (e.g., JALS-204 produced by Japan Synthetic Rubber Co., Ltd.).

The two substrates are bonded together with a sealing material, and a liquid crystal material ($\Delta\epsilon>0$; e.g., ZLI2806: produced by Merck & Co.; chiral dopant is added so that the liquid crystal molecules are twisted at 100 degrees relative to the cell thickness) is injected into a space between the substrates. Thus, a PALC display device is formed. It is confirmed that axially symmetrical alignment occurs.

The transmittance of the cell is higher by 10% than that of a PALC display device of an n-type axially symmetrical alignment mode for the following reason. Since the display device in Example 2 operates in a normally white mode, the transmittance is determined by the initial setting of the liquid crystal layer regardless of the state of voltage application. The contrast in Example 2 is almost the same as in the PALC display device of the n-type axially symmetrical alignment mode when supplied with a voltage of 80 V. The response speed obtained when a voltage of 80 V is applied is about 38 ms in Example 2 as opposed to 60 ms in the n-type axially symmetrical alignment mode.

When the transparent electrode is provided on the convex structure instead of below the convex structure, no problem occurs regarding the alignment regulation. An increase in the transmittance in the black state is negligible.

EXAMPLE 3

Concave Structure, ITO Electrode on the Wall, PALC

Figure 14A:
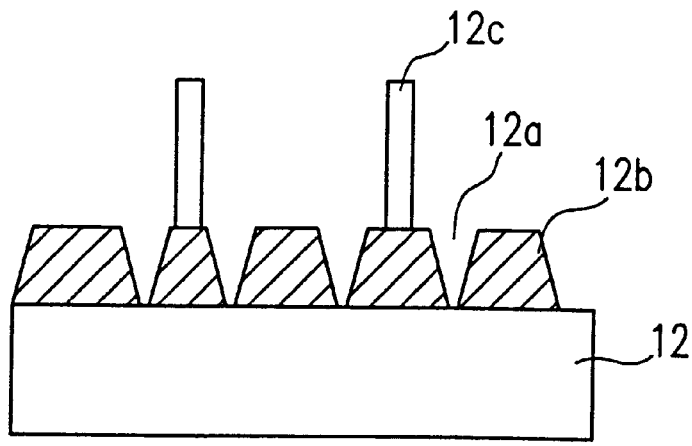
FIG. 14A is a cross-sectional view of a concave structure of an LCD device in Example 3.
Figure 14B:
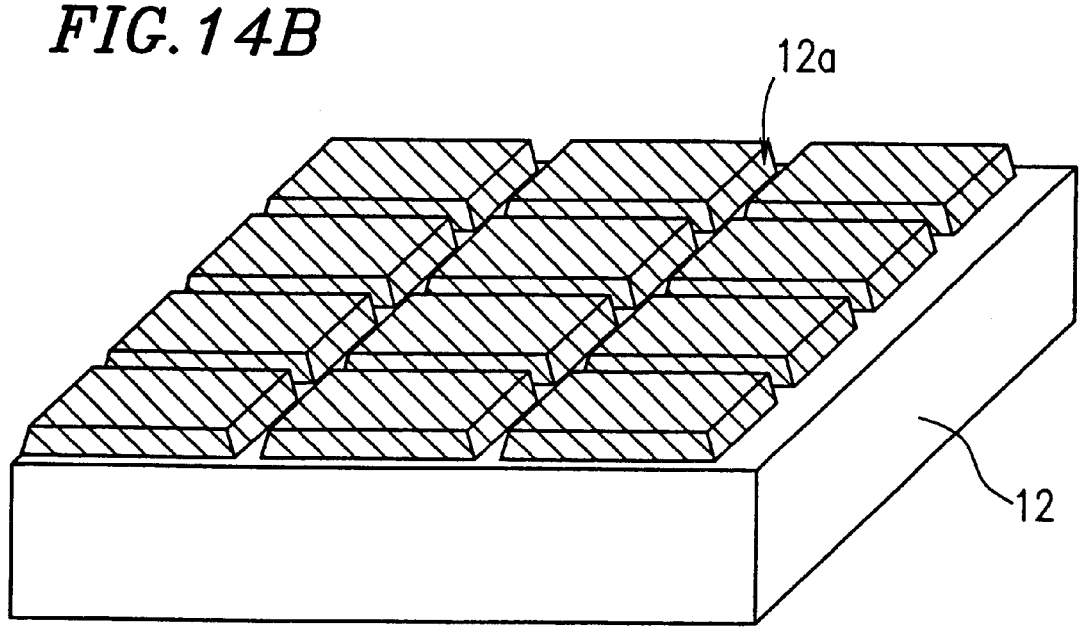
FIG. 14B is a perspective view of the concave structure shown in FIG. 14A.

As shown in FIGS. 14A and 14B, a concave structure 12b having a groove 12a is formed on a glass substrate 12, by photolithography using an emulsion mask. The concave structure 12b is formed of a resist material. The groove 12a has a depth of about 2 μm, a width of about 30 μm and an inclination angle of about 15 degrees. On the concave structure 12b, a transparent electrode (not shown) of ITO is formed. Column-like structures 12c having a height of about 6 μm are formed thereon as spacers by photolithography. The cell thickness of a liquid crystal region defined by the wall is about 6 μm. The resultant assembly is covered with a horizontal alignment layer (e.g., SE9742 produced by Nissan Chemical Industries, Ltd.). In FIGS. 14A and 14B, a transparent electrode and a horizontal alignment layer provided on the concave structure 12b are omitted for simplicity.

As a counter substrate, a plasma substrate similar to that in Example 2 is used. A surface of the thin glass plate facing the liquid crystal layer is covered with a vertical alignment layer (e.g., JALS-204 produced by Japan Synthetic Rubber Co., Ltd.).

The two substrates are bonded together with a sealing material, and a liquid crystal material ($\Delta\epsilon>0$; e.g., ZLI2806: produced by Merck & Co.; chiral dopant is added so that the liquid crystal molecules are twisted at 100 degrees relative to the cell thickness) is injected into a space between the substrates. Thus, a PALC display device is formed. It is confirmed that axially symmetrical alignment occurs.

When such a concave structure is included in the PALC display device, a voltage is more easily applied to portions of the liquid crystal layer which include the grooves and thus are thicker than the rest of the liquid crystal layer, the liquid crystal molecules in these portions respond at a low voltage. This urges the liquid crystal molecules in the remaining portion to be driven. Accordingly, the response speed of the liquid crystal molecules in the intermediate portion is favorably raised.

A color filter can be used in Example 3 with no problem.

EXAMPLE 4

Black Matrix is Used as the Convex Structure and Covered with a Horizontal Alignment Layer As shown in FIG. 15, a color layer 22 including red, blue and green portions is formed on the glass substrate 21. Then, a black matrix 23 is formed of a resin material as a convex structure, thus forming a color filter substrate. The convex structure has a height of about 1.5 μm, a width of about 30 μm, and an inclination angle of about 20 degrees. A transparent electrode (not shown) is formed thereon, and column-like structures (not shown) having a height of about 3 μm are formed on the transparent electrode as spacers by photolithography. Accordingly, the cell thickness of a liquid crystal region defined by the wall is about 4.5 μm.

A transparent electrode is provided on a counter substrate, and a vertical alignment layer (e.g., JALS-204 produced by Japan Synthetic Rubber Co., Ltd.) is provided thereon.

The two substrates are bonded together with a sealing material, and a liquid crystal material ($\Delta\epsilon>0$; e.g., ZLT2806: produced by Merck & Co.; chiral dopant is added so that the liquid crystal molecules are twisted at 100 degrees relative to the cell thickness) is injected into a space between the substrates. Thus, a liquid crystal cell is formed.

FIG. 12 shows the above-produced liquid crystal cell observed by a polarization microscope. As shown in FIG. 12, the liquid crystal molecules were confirmed to be aligned in an axially symmetrical manner repeatedly. In FIG. 12, the liquid crystal molecules on the wall, which are not uniformly aligned, are omitted.

As can be appreciated from Example 4, axially symmetrical alignment is obtained without using a photo-curable monomer for securing the alignment.

In Example 4, the counter electrode can be a TFT substrate including TFTs, or a plasma substrate. When a plasma substrate is used, a vertical alignment layer needs to be provided as described above.

EXAMPLE 5

Electrode Lines for TFTs are Used as the Convex Structure and Covered with a Transparent Conductive Layer Used as a Horizontal Alignment Layer A TFT substrate shown in FIGS. 16A and 16B including gate lines 32 and source lines 33 is assembled with a color filter substrate covered with a vertical alignment layer. A liquid crystal material is injected into a space between the two substrates. Thus, a liquid crystal cell is produced.

The gate lines 32 and source lines 33 have a thickness of about 0.5 μm. However, since the edges of the lines are at substantially right angle, axially symmetrical alignment is stably obtained. Even when the convex structure is relatively low, stable axially symmetrical alignment is obtained as long as the convex structure has sharp edges.

As described above, according to the present invention, a liquid crystal display device and a PALC display device using such an LCD device which realize stable axially symmetrical alignment without using the alignment securing function of a photo-curable monomer, thus to provide a large viewing angle can be provided at a low cost. Use of the hybrid-type axially symmetrical alignment raises the response speed of the liquid crystal molecules to the voltage application. Use of a light-transmissive convex-concave structure allows a large pixel area to be divided into smaller regions without reducing the numerical aperture. In the case where the convex-concave structure is provided below the transparent electrode, reduction in the contrast is avoided. In the case of a PALC display device, the contrast is not reduced even when the convex-concave structure is provided on the transparent electrode. Use of a concave structure in a PALC display device significantly improve the response speed.

In the case where the vertical alignment layer is provided on one of the substrates, hybrid-type ASM alignment is obtained by using the elements usually included in an LCD device without separately providing a horizontal alignment layer. The convex-concave structure for regulating the alignment can be realized using an element usually included in an LCD device. In this manner, a high performance display is produced at low cost by reducing the number of components.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device, comprising:
   a first substrate having a vertical alignment layer provided thereon;
   a second substrate having a horizontal alignment layer provided thereon;
   a liquid crystal layer including liquid crystal molecules interposed between the first substrate and the second substrate; and
   a concave-convex structure for regulating an alignment direction of the liquid crystal molecules and a transparent conductive layer provided on the concave-convex structure, the concave-convex structure being provided on one of the first substrate and the second substrate with one of the vertical alignment layer and the horizontal alignment layer interposed therebetween,
   wherein the liquid crystal molecules in the vicinity of the horizontal alignment layer are aligned in an axially symmetrical manner when no voltage is provided, and the liquid crystal molecules in the liquid crystal layer are aligned substantially vertically relative to the first substrate and the second substrate when a voltage is applied.

2. A liquid crystal display device according to claim 1, wherein the convex-concave structure is provided on the second substrate with the horizontal alignment layer interposed therebetween.

3. A liquid crystal display device according to claim 1, wherein the liquid crystal layer is a p-type liquid crystal material.

4. A liquid crystal display device according to claim 1, wherein the convex-concave structure has convex portions provided in a lattice pattern.

5. A liquid crystal display device according to claim 1, wherein the convex-concave structure has convex portions provided in a checkered pattern.

6. A liquid crystal display device according to claim 1, wherein the convex-concave structure has concave portions provided in a lattice pattern.

7. A liquid crystal display device according to claim 1, wherein the convex-concave structure has concave portions provided in a checkered pattern.

8. A liquid crystal display device according to claim 1, further comprising a phase plate having a negative refractive index anisotropy outside at least one of the first substrate and the second substrate.

9. A liquid crystal display device according to claim 1, further comprising a plurality of switching elements, and a plurality of source lines and a plurality of gate lines for driving the plurality of switching elements,
   wherein the plurality of switching elements, the plurality of source lines and the plurality of gate lines are provided on one of the first substrate and the second substrate, and
   wherein the plurality of source lines and the plurality of gate lines act as a convex-concave structure having convex portions.

10. A liquid crystal display device according to claim 1, further comprising a layer having a plurality of portions of different colors and a black matrix portion having a greater height than a height of the plurality of portions of different colors, wherein the black matrix portions act as a convex-concave structure having convex portions.

11. A liquid crystal display device according to claim 10, wherein the black matrix portions are formed of a resin.

12. A plasma-addressed liquid crystal display device, wherein the liquid crystal display device according to claim 1 has the first substrate formed of a plasma section, the plasma section including:
   a third substrate;
   a dielectric layer interposed between the second substrate and the third substrate;
   a plurality of ribs for dividing a space between the dielectric layer and the third substrate into a plurality of plasma chamber containing a noble gas; and an anode electrode and a cathode electrode accommodated in each of the plasma chambers, wherein voltage switching is performed by changing the plasma state of the noble gas.

13. A plasma-addressed liquid crystal display device, wherein the liquid crystal display device according to claim 1 has the second substrate formed of a plasma section, the plasma section including:

a third substrate;

a dielectric layer interposed between the first substrate and the third substrate;

a plurality of ribs for dividing a space between the dielectric layer and the third substrate into a plurality of plasma chamber containing a noble gas; and an anode electrode and a cathode electrode accommodated in each of the plasma chambers, wherein voltage switching is performed by changing the plasma state of the noble gas.

14. A liquid crystal display device, comprising:

a first substrate;

a second substrate having a vertical alignment layer provided thereon;

a liquid crystal layer including liquid crystal molecules interposed between the first substrate and the second substrate;

a concave-convex structure for regulating an alignment direction of the liquid crystal molecules and a transparent conductive layer provided on the concave-convex structure, the concave-convex structure being provided on the first substrate, and the transparent conductive layer being in contact with the liquid crystal layer, wherein the liquid crystal molecules in the vicinity of the transparent conductive layer are aligned in an axially symmetrical manner when no voltage is provided, and the liquid crystal molecules in the liquid crystal layer are aligned substantially vertically relative to the first substrate and the second substrate when a voltage is applied.

15. A liquid crystal display device according to claim 14, wherein the liquid crystal layer is a p-type liquid crystal material.

16. A liquid crystal display device according to claim 14, wherein the convex-concave structure has convex portions provided in a lattice pattern.

17. A liquid crystal display device according to claim 14, wherein the convex-concave structure has convex portions provided in a checkered pattern.

18. A liquid crystal display device according to claim 14, wherein the convex-concave structure has concave portions provided in a lattice pattern.

19. A liquid crystal display device according to claim 14, wherein the convex-concave structure has concave portions provided in a checkered pattern.

20. A liquid crystal display device according to claim 14, further comprising a phase plate having a negative refractive index anisotropy outside at least one of the first substrate and the second substrate.

21. A liquid crystal display device according to claim 14, further comprising a plurality of switching elements, and a plurality of source lines and a plurality of gate lines for driving the plurality of switching elements, wherein the plurality of switching elements, the plurality of source lines and the plurality of gate lines are provided on one of the first substrate and the second substrate, and wherein the plurality of source lines and the plurality of gate lines act as a convex-concave structure having convex portions.

22. A liquid crystal display device according to claim 14, further comprising a layer having a plurality of portions of different colors and a black matrix portion having a greater height than a height of the plurality of portions of different colors, wherein the black matrix portions act as a convex-concave structure having convex portions.

23. A liquid crystal display device according to claim 22, wherein the black matrix portions are formed of a resin.

24. A plasma-addressed liquid crystal display device, wherein the liquid crystal display device according to claim 14 has the second substrate having the vertical alignment layer provided thereon, the second substrate being formed of a plasma section, the plasma section including:

a third substrate;

a dielectric layer interposed between the first substrate and the third substrate;

a plurality of ribs for dividing a space between the dielectric layer and the third substrate into a plurality of plasma chamber containing a noble gas; and an anode electrode and a cathode electrode accommodated in each of the plasma chambers, wherein voltage switching is performed by changing the plasma state of the noble gas.

25. A plasma-addressed liquid crystal display device, comprising:

a first substrate;

a second substrate;

a dielectric layer provided between the first substrate and the second substrate;

a liquid crystal layer including liquid crystal molecules provided between the second substrate and the dielectric layer;

a plurality of ribs for dividing a space between the dielectric layer and the first substrate into a plurality of plasma chambers containing a noble gas;

an anode electrode and a cathode electrode accommodated in each of the plurality of plasma chambers;

a vertical alignment layer provided on one of the second substrate and the dielectric layer so as to be in contact with the liquid crystal layer;

a horizontal alignment layer provided on the other of the second substrate and the dielectric layer so as to be in contact with the liquid crystal layer; and a convex-concave structure for regulating an alignment direction of the liquid crystal molecules, the convex-concave structure being provided on one of the second substrate and the dielectric layer with one of the vertical alignment layer and the horizontal alignment layer interposed therebetween, wherein the liquid crystal molecules in the vicinity of the horizontal alignment layer are aligned in an axially symmetrical manner when no voltage is applied, and the liquid crystal molecules in the liquid crystal layer are aligned substantially vertically relative to the second substrate and the dielectric layer when a voltage is applied, and wherein voltage switching is performed by changing the plasma state of the noble gas.

26. A plasma-addressed liquid crystal display device, comprising:

a first substrate;

a second substrate;

a dielectric layer provided between the first substrate and the second substrate;

a liquid crystal layer including liquid crystal molecules provided between the second substrate and the dielectric layer;

a plurality of ribs for dividing a space between the dielectric layer and the first substrate into a plurality of plasma chambers;

an anode electrode and a cathode electrode accommodated in each of the plurality of plasma chambers containing noble gas;

a convex-concave structure for regulating an alignment direction of the liquid crystal molecules and a transparent conductive layer provided on the convex-concave structure, the convex-concave structure being provided on the second substrate, and the transparent conductive layer being in contact with the liquid crystal layer; and a vertical alignment layer provided on the dielectric layer, wherein the liquid crystal molecules in the vicinity of the transparent conductive layer are aligned in an axially symmetrical manner when no voltage is applied, and the liquid crystal molecules in the liquid crystal layer are aligned substantially vertically relative to the second substrate and the dielectric layer when a voltage is applied, and wherein voltage switching is performed by changing the plasma state of a noble gas.

* * * * *